Figure 1:
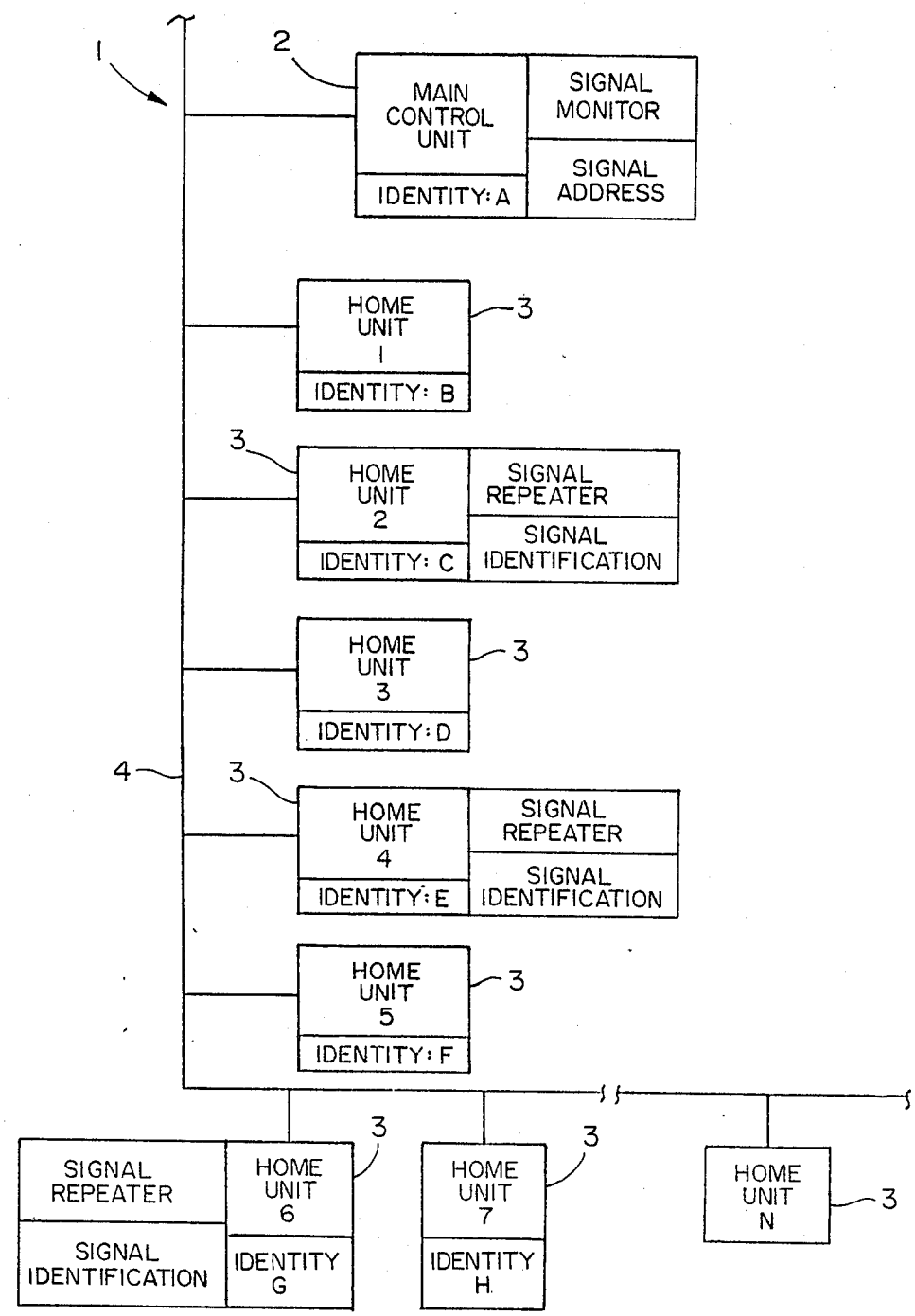

United States Patent [19]

Trask et al.

[11] Patent Number: 4,937,569
[45] Date of Patent: Jun. 26, 1990

[54] DATA COMMUNICATION SYSTEM

[75] Inventors: Jeremy R. Trask, London; Anthony Wiener, Slough, both of England

[73] Assignee: EMI Limited, Hayes, England

[21] Appl. No.: 212,068

[22] Filed: Jun. 28, 1988

Related U.S. Application Data

[63] Continuation of Ser. No. 857,058, Apr. 29, 1986, abandoned.

[30] Foreign Application Priority Data

May 9, 1985 [GB] United Kingdom ................ 8511758

[51] Int. Cl.⁵ .......................... H04Q 5/00; H04Q 9/00
[52] U.S. Cl. .......................... 340/825.52; 340/825.02; 340/310 R; 370/85.1; 370/16; 455/8
[58] Field of Search .................... 455/8, 9, 14; 340/310 R, 825.02, 825.03, 825.52; 370/16, 58, 88, 85, 60, 90

[56] References Cited

U.S. PATENT DOCUMENTS

| | | | |
|---|---|---|---|
| 3,693,155 | 9/1972 | Crafton et al. | 340/825.02 |
| 3,944,723 | 3/1976 | Fong | 340/825.02 |
| 3,967,264 | 6/1976 | Whyte et al. | |
| 4,210,901 | 7/1980 | Whyte et al. | 340/310 R |
| 4,230,989 | 10/1980 | Buehrle | |
| 4,399,531 | 8/1983 | Grande et al. | 370/94 |
| 4,427,968 | 1/1984 | York | 340/310 R |
| 4,550,397 | 10/1985 | Turner et al. | 370/94 |
| 4,651,318 | 3/1987 | Luderer | 370/94 |

FOREIGN PATENT DOCUMENTS 58-17750  2/1983  Japan .

Primary Examiner—Robert L. Griffin
Assistant Examiner—Ralph Smith
Attorney, Agent, or Firm—Fleit, Jacobson, Cohn, Price, Holman & Stern

[57] ABSTRACT

The signalling network has a main control unit which can communicate with any of a number of home units each associated with a separate household. Some home units have signal-repeater facilities. Each of the control units and the home units has an address identity unique in the network.

When a signal is sent out targeted at a specific home unit, the main control unit monitors for acknowledgement of reaching its destination. If no such acknowledgement is received, the main control unit sends out the signal again, but re-routed via an intermediate home unit with a repeater facility.

6 Claims, 2 Drawing Sheets

DATA COMMUNICATION SYSTEM

This application is a continuation of application Ser. No. 857,058, filed Apr. 29, 1986, now abandoned.

The present invention relates to a data communications system, especially but not solely to a mainsborne signalling system which makes use of the electrical supply wiring.

A typical system, for utility telemetry, has a central controller located at a distribution substation and a large number of home units each sited at the premises of a consumer adjacent the electricity meter. Communication between the central controller and the home units is achieved by sending spread spectrum signals via the mains electricity circuit wiring. Clearly many sources of noise and attenuation (inter alia normal domestic equipment) are connected intermittently and randomly into the system, thereby producing unpredictable degrees of line attenuation and of interference with the system signals at any given time. Accordingly the range of a signal emitted from the central control (or from a home unit) tends to vary significantly, dependent on the time of day and on the time of day and on the season of the year.

An object of the present invention is to provide a data communications system which is not subject to the disadvantages associated with the variability of signal range.

The present invention provides a communications system having a main control unit and a plurality of stations, one or more of the stations having signal-repeater means, the system having means to selectively use the repeater means of one or more stations in the routing of a signal between the control unit and a station.

The present invention also provides a communications system having a main control unit and a plurality of stations, one or more of the stations having signal-repeater means, the system having means to detect that a signal has not reached its intended station(s) and means to direct the signal to an intermediate station for subsequent routing to its intended station(s).

Thus, for example, when a system signal is unable to reach its destination station(s), it can be routed via one or more intermediate stations which act, in this circumstance, as a repeater.

Preferably, the main control means incorporates means to modify the signal to address it to an intermediate station for subsequent routing to the intended station(s).

Preferably the main control means has means to monitor for the launch of the signal from the intermediate station towards the intended station(s).

Preferably the system utilizes a signal which includes a section identifying the target station(s) which is or are the intended destination of the signal, and a section identifying any intermediate station which is to act as a repeater in a re-routing operation.

Preferably a station has means to process a received signal to locate and inspect any target identity and/or repeater identity contained within the received signal; the station may also have means to compare any identity of a received signal with that of the station identity and means to effect appropriate action.

Preferably a station has a target identity which is for use when that station is the intended destination of a signal, and a repeater identity (different to the target identity) which is for use when that station is to operate on the signal as a repeater.

Figure 2:
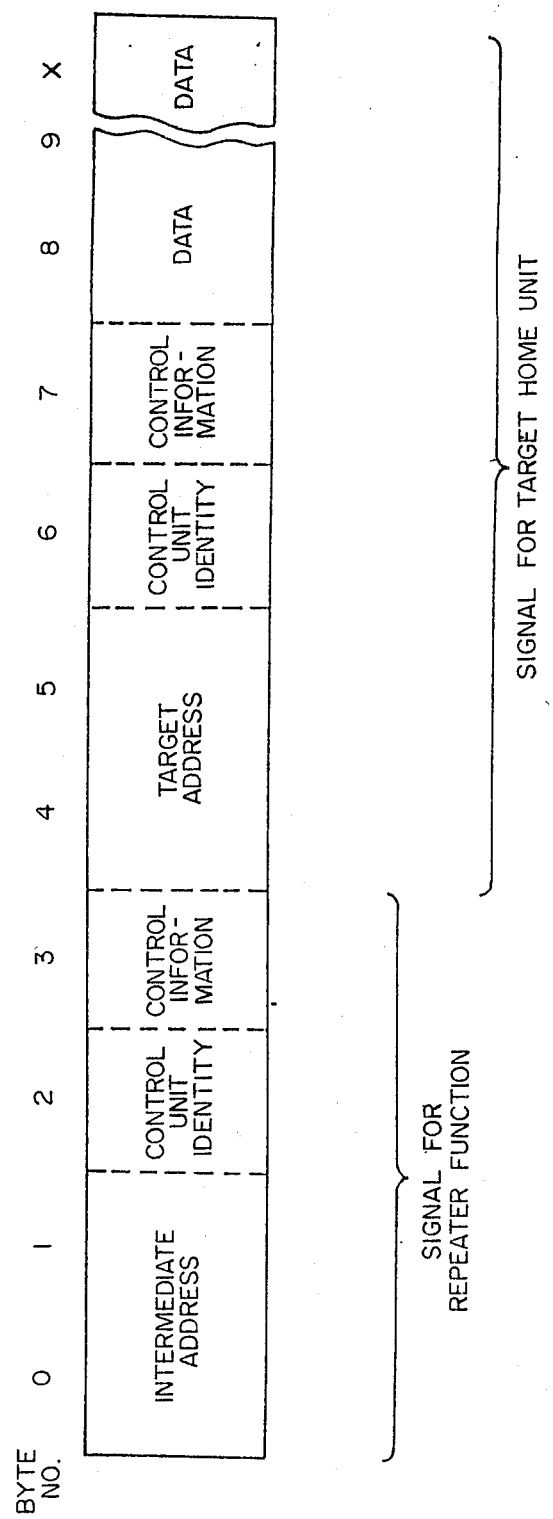

In order that the invention may more readily be understood, a description is now given, by way of example only, reference being made to the accompanying drawings, in which:

FIG. 1 is a schematic diagram of part of a data communications system embodying the present invention; and FIG. 2 is a schematic diagram of the format of a signal used in the system of FIG. 1.

The mainsborne signalling network 1 illustrated in FIG. 1 has a main control unit 2 located at a distribution substation; this control unit 2 can communicate with any of a number of home units 3 by means of signals sent along the electrical mains wiring 4. Each home unit 3 is associated with a separate household and is located at the respective electricity meter such that it can provide information on the meter reading (and optionally on the condition of the meter) and other information whenever polled by the control unit 2. In FIG. 1, the home units are labelled "HU 1", "HU 2" and so on, in order to clarify distinction between individual units; some of the home units 3 (namely HU 2, HU 4 and HU 6) have signal-repeater facilities, whose use will be described in greater detail below. Each of the control unit 2 and of the home units 3 has an address identity unique in the network 1; for simplicity, the address identity for control unit 2 is referred to as A, that for HU 1 as B, that for HU 2 as C and so on.

Consider the situation in which control unit 2 requires to determine the electricity meter reading for the property at which HU 7 is located. Accordingly control unit 2 applies, to the mains wiring 4, a signal R targeted at HU7 and instructing it to send a return signal indicating the respective meter reading. Thereafter, control unit 2 monitors the mains wiring 4 for any acknowledgement signals or return signals from HU 7. If the line attenuation or interference on mains wiring circuit is substantial, it may reduce the range of any signal output from control unit 2 to such an extent that it would not reach HU 7. Thus, if after a predetermined time the control unit has not detected any such acknowledgement or return signal, it re-routes the signal R to an intermediate home unit which has a repeater facility, for example HU 6. After sending out the re-routed signal R, it monitors the wiring 4 for any acknowledgement signal from HU6 or for launch of the signal from HU 6 towards HU 7; if, after a predetermined time, control unit 2 has not detected any such signal from HU 6, it re-routes the signal R to a closer home unit with a signal-repeater facility, for example HU 4. If the signal R reaches HU 4, then the latter cleans up and amplifies the signal R before launching it again onto mains wiring 4 towards HU 7; HU 4 attempts to send the signal directly to HU 7, but if this fails it re-routes it via an intermediate home unit with a signal-repeater facility, i.e. HU 6. Alternatively, HU 4 notes the range of the signal R already achieved (i.e. in this case from central control unit 2 to HU 4) and plans the continued path to HU 7 accordingly.

A signal to be sent on the network 1 has the format as illustrated in FIG. 2. The signal has three sections. One section defines the home unit which is to be used as an intermediate in a re-routing operation, this section consisting of two bytes for the address of the respective home unit acting as the intermediate, one byte indicating the identity of the central control unit (necessary when a number of networks, each with their own central control, are connected together), and one byte for control information. Another section defines the home unit(s) which is or are the intended destination for the signal, this section consisting of two bytes for the address of the target home unit(s), one byte for the identity of the central control unit and one byte for control information. The remaining section consists of n bytes of data information to be supplied to the target home unit(s) to instruct whatever operation is appropriate.

Returning to the situation of control unit 2 needing to communicate with HU 7, the following table lists the necessary stages when the line attenuation and/or interference is such that the range of the signal output by control unit 2 is less than the distance between three home units, assuming (for the purpose of this simplified example) that they are all equi-spaced.

| STAGE | TRANSMITTING UNIT | SIGNAL SENT OUT (BYTE NOS) | | | | | | | RESPONSE |
|---|---|---|---|---|---|---|---|---|---|
| | | 0/1 | 2 | 3 | 4/5 | 6 | 7 | 8 X | |
| 1 | Control Unit 1 | — | — | — | H | A | W | Z | None |
| 2 | Control Unit 1 | G | A | Y | H | A | W | Z | None |
| 3 | Control Unit 1 | E | A | Y | H | A | W | Z | None |
| 4 | Control Unit 1 | C | A | Y | H | A | W | Z | Received |
| 5 | Home Unit 2 | — | — | — | H | C | W | Z | None |
| 6 | Home Unit 2 | G | C | Y | H | C | W | Z | None |
| 7 | Home Unit 2 | E | C | Y | H | C | W | Z | Received |
| 8 | Home Unit 4 | — | — | — | H | E | W | Z | None |
| 9 | Home Unit 4 | G | E | Y | H | E | W | Z | Received |
| 10 | Home Unit 6 | — | — | — | H | G | W | Z | Received |

In this table, Y represents the control information for any home unit acting as an intermediate, W represents the control information for the target home unit HU 7, and Z represents the data information for the target home unit HU 7. Thus at the start of the transmission operation, main control unit 2 applies to the wiring 4 a signal R which has byte numbers 1 to 4 blank, byte numbers 4 and 5 containing identity H, byte number 6 containing identity A, byte number 7 containing W and byte numbers 8 to X containing Z. Once control unit 2 has applied this signal to wiring 4, the control unit monitors wiring 4 for any response from HU 7, but none is forthcoming. Thereafter it proceeds to the second stage indicated in the table, and so on.

In one form of home unit for use in the network 1, each home unit has the ability to function either in normal mode or in repeater mode. The repeater capability of the home unit is achieved by the provision of programmed procedures held in memory devices; operation of these procedures is implemented when the home unit detects a repeater command in any received signal. The home unit uses a single set of access protocals both for its normal mode and for its repeater mode. The home unit consists of an interface connected to a control bus, which also functions as a system address bus and a system data bus. The control bus is connected to a processing block which incorporates a central processing unit, a clock and ROM and RAM storage which includes the normal mode procedures and the repeater-mode procedure. The control bus is also connected to a power supply unit and to control units with interfaces to the user.

We claim:

1. A communications system comprising a main control unit, a plurality of stations each capable of receiving, generating and transmitting signals, the stations being spaced apart along a common transmission path such that signals may be transmitted directly between the main central unit and any intended destination station, signal-repeater means in each of one or more of said stations, means to selectively effect use of the repeater means of one or more of said stations in sending a signal along the common transmission path between the control unit and a station on the common transmission path, the means to selectively effect use of the repeater means comprising:

means to determine that a signal has not reached its intended destination station;

means to modify the signal to address it to a station incorporating a signal repeater means on the common transmission path intermediate the main control unit and the intended destination station, for subsequent passage to the intended destination station;

means to direct the signal to said intermediate station corresponding to the modified address for subsequent passage to its intended destination station; and the main control unit having means to monitor for the launch of the signal from the intermediate station towards the intended station(s).

2. A communications system according to claim 1, characterised by a station having means to process a received signal to locate and inspect any target identity and/or repeater identity contained within the received signal.

3. A communications system according to claim 1, characterised by a station having a target identity which is for use when that station is the intended destination of a signal, and a repeater identity (different to the target identity) which is for use when that station is to operate on the signal as a repeater.

4. A communications system comprising a main control unit, a plurality of stations each capable of receiving, generating and transmitting signals, the stations being spaced apart along a common transmission path such that signals may be transmitted directly between the main central unit and any intended destination station, signal-repeater means in each of one or more of said stations, means to selectively effect use of the repeater means of one or more of said stations in sending a signal along the common transmission path between the control unit and a station on the common transmission path, the means to selectively effect use of the repeater means comprising:

means to determine that a signal has not reached its intended destination station;

means to modify the signal to address it to a station incorporating a signal repeater means on the common transmission path intermediate the main control unit and the intended destination station, for subsequent passage to the intended destination station;

means to direct the signal to said intermediate station corresponding to the modified address for subsequent passage to its intended destination station; and the system utilizing a signal which includes a section identifying the target station(s) which is or are the intended destination of the signal, and a section identifying any intermediate station which is to act as a repeater.

5. A main control unit for a communications system with a plurality of stations each capable of receiving, generating and transmitting signals, the stations being spaced apart along a common transmission path such that signals may be transmitted directly between the main control unit and any intended destination station, one or more of said stations having signal-repeater means, the main control unit comprising means to selectively effect use of the repeater means of one or more of said stations in sending a signal along the common transmission path between the control unit and a station on the common transmission path, means to determine that a signal has not reached its intended destination station, means to modify a signal to address it to a station incorporating a signal repeater means on the common transmission path intermediate the main control unit and the intended destination station for subsequent passage to the intended destination, and means to direct the signal to said intermediate station corresponding to the modified address for subsequent passage to its intended destination station.

6. A control unit according to claim 5, characterised by means to monitor for the launch of the signal from the intermediate station towards the intended station(s).

* * * * *